(12) United States Patent
Sautto et al.

(10) Patent No.: US 12,640,649 B2
(45) Date of Patent: May 26, 2026

(54) BIDIRECTIONAL UNIPOLAR-BIPOLAR DC-DC CONVERTER WITH DIGITALLY ASSISTED COMMON-MODE LOOP

(71) Applicant: Renesas Electronics America Inc., Milpitas, CA (US)

(72) Inventors: Marco Sautto, Zurich (CH); Gustavo James Mehas, Fall City, WA (US); Filippo Maria Neri, Seefeldstrasse (CH); Fabio di Fazio, Seefeldstrasse (CH)

(73) Assignee: Renesas Electronics America Inc., Milpitas, CA (US)

( * ) Notice: Subject to any disclaimer, the term of this patent is extended or adjusted under 35 U.S.C. 154(b) by 166 days.

(21) Appl. No.: 18/543,598

(22) Filed: Dec. 18, 2023

(65) Prior Publication Data

US 2025/0202359 A1      Jun. 19, 2025

(51) Int. Cl.
*H02M 3/158*          (2006.01)
(52) U.S. Cl.
CPC .................................. *H02M 3/158* (2013.01)
(58) Field of Classification Search
CPC .... H02M 3/156; H02M 3/158; H02M 3/1588; H02M 3/155; H02M 3/1582; H02M 3/157; H02M 3/1563; H02M 3/1584; H02M 1/32; H02M 1/081–084; H02M 1/0006; H04B 2215/069
See application file for complete search history.

(56) References Cited

U.S. PATENT DOCUMENTS

2023/0150378 A1 *   5/2023   Hao ...................... H02M 3/158
                                                             320/104

* cited by examiner

*Primary Examiner* — Bryan R Perez
(74) *Attorney, Agent, or Firm* — SCULLY, SCOTT, MURPHY & PRESSER, P.C.

(57)          ABSTRACT
In an embodiment, a semiconductor device is disclosed that includes a bidirectional unipolar-bipolar DC-DC circuit. The bidirectional unipolar-bipolar DC-DC circuit includes a first transistor, a second transistor, a third transistor and a fourth transistor. The first transistor is connected between a reference ground connection and a first connection of a coil. The second transistor is connected between a positive bipolar input/output connection and the first connection of the coil. The third transistor is connected between a second connection of the coil and a negative bipolar input/output connection. The fourth transistor is connected between the second connection of the coil and a unipolar voltage input/output connection. The bidirectional DC-DC circuit is configured to concurrently activate the second and third transistors to cause a current flow through the coil between the positive bipolar input/output connection and the negative bipolar input/output connection.

17 Claims, 8 Drawing Sheets

100

BIDIRECTIONAL UNIPOLAR-BIPOLAR DC-DC CONVERTER WITH DIGITALLY ASSISTED COMMON-MODE LOOP

BACKGROUND OF THE SPECIFICATION

The present disclosure relates in general to apparatuses and methods for conversion between unipolar and bipolar DC power signals during power transfer between wireless power transmitters and wireless power receivers.

Wireless power systems often include a power transmitter and a power receiver. When a transmission coil of the power transmitter and a receiver coil of the power receiver are positioned close to one another they form a transformer that facilitates inductive transmission of an alternating current (AC) power between the power transmitter and the power receiver. The power transmitter includes an inverter circuit that converts bipolar direct current (DC) power into AC power for wireless transfer across an isolation gap to the power receiver. The power receiver includes a rectifier circuit that converts the received AC power into bipolar DC power for use by various loads or components that require DC power to operate. The power transmitter is often supplied by unipolar DC power, e.g., from a 5V wall adapter, which is converted to bipolar DC power for input to the inverter circuit. Similarly, the loads or components supplied by the power receiver may need unipolar DC power to operate, which is converted from the bipolar DC power output of the rectifier circuit.

SUMMARY

In an embodiment, a semiconductor device is disclosed that comprises a bidirectional unipolar-bipolar DC-DC circuit. The bidirectional unipolar-bipolar DC-DC circuit can include a first transistor, a second transistor, a third transistor and a fourth transistor. The first transistor can be connected between a reference ground connection and a first connection of a coil. The second transistor can be connected between a positive bipolar input/output connection and the first connection of the coil. The third transistor can be connected between a second connection of the coil and a negative bipolar input/output connection. The fourth transistor can be connected between the second connection of the coil and a unipolar voltage input/output connection. The bidirectional DC-DC circuit can be configured to concurrently activate the second and third transistors to cause a current flow through the coil between the positive bipolar input/output connection and the negative bipolar input/output connection.

In an embodiment, a semiconductor device is disclosed that comprises a bidirectional unipolar-bipolar DC-DC circuit. The bidirectional unipolar-bipolar DC-DC circuit can include a first transistor, a second transistor, a third transistor and a fourth transistor. The first transistor can be connected between a reference ground connection and a first connection of a coil. The second transistor can be connected between a positive bipolar input/output connection and the first connection of the coil. The third transistor can be connected between a second connection of the coil and a negative bipolar input/output connection. The fourth transistor can be connected between the second connection of the coil and a unipolar voltage input/output connection. The semiconductor device can further include a control and common mode circuit. The control and common mode circuit can include a linear common mode loop that can be configured to maintain a symmetry relative to the reference ground connection between the positive bipolar input/output connection and the negative bipolar input/output connection. The control and common mode circuit can further include a digital control loop that is configured to adjust an on-time pulse length of the at least one of the first, second, third and fourth transistors to drive an absolute value of a first current corresponding to the positive bipolar input/output connection and an absolute value of a second current corresponding to the negative bipolar input/output connection below a predetermined reference current value.

In an embodiment, a semiconductor device is disclosed that comprises a bidirectional unipolar-bipolar DC-DC circuit. The bidirectional unipolar-bipolar DC-DC circuit can include a first transistor, a second transistor, a third transistor and a fourth transistor. The first transistor can be connected between a reference ground connection and a first connection of a coil. The second transistor can be connected between a positive bipolar input/output connection and the first connection of the coil. The third transistor can be connected between a second connection of the coil and a negative bipolar input/output connection. The fourth transistor can be connected between the second connection of the coil and a unipolar voltage input/output connection. The bidirectional DC-DC circuit can be configured to concurrently activate the second and third transistors to cause a current flow through the coil between the positive bipolar input/output connection and the negative bipolar input/output connection. The semiconductor device can further include a bidirectional inverter/rectifier circuit that can be connected to the positive bipolar input/output connection, the negative bipolar input/output connection, a first AC connection and a second AC connection. The bidirectional inverter/rectifier circuit can be configured to convert energy between a bipolar DC power supply defined by the positive bipolar input/output connection and the negative bipolar input/output connection, and an AC power supply defined by the first and second AC connections.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

DETAILED DESCRIPTION

Figure 1:
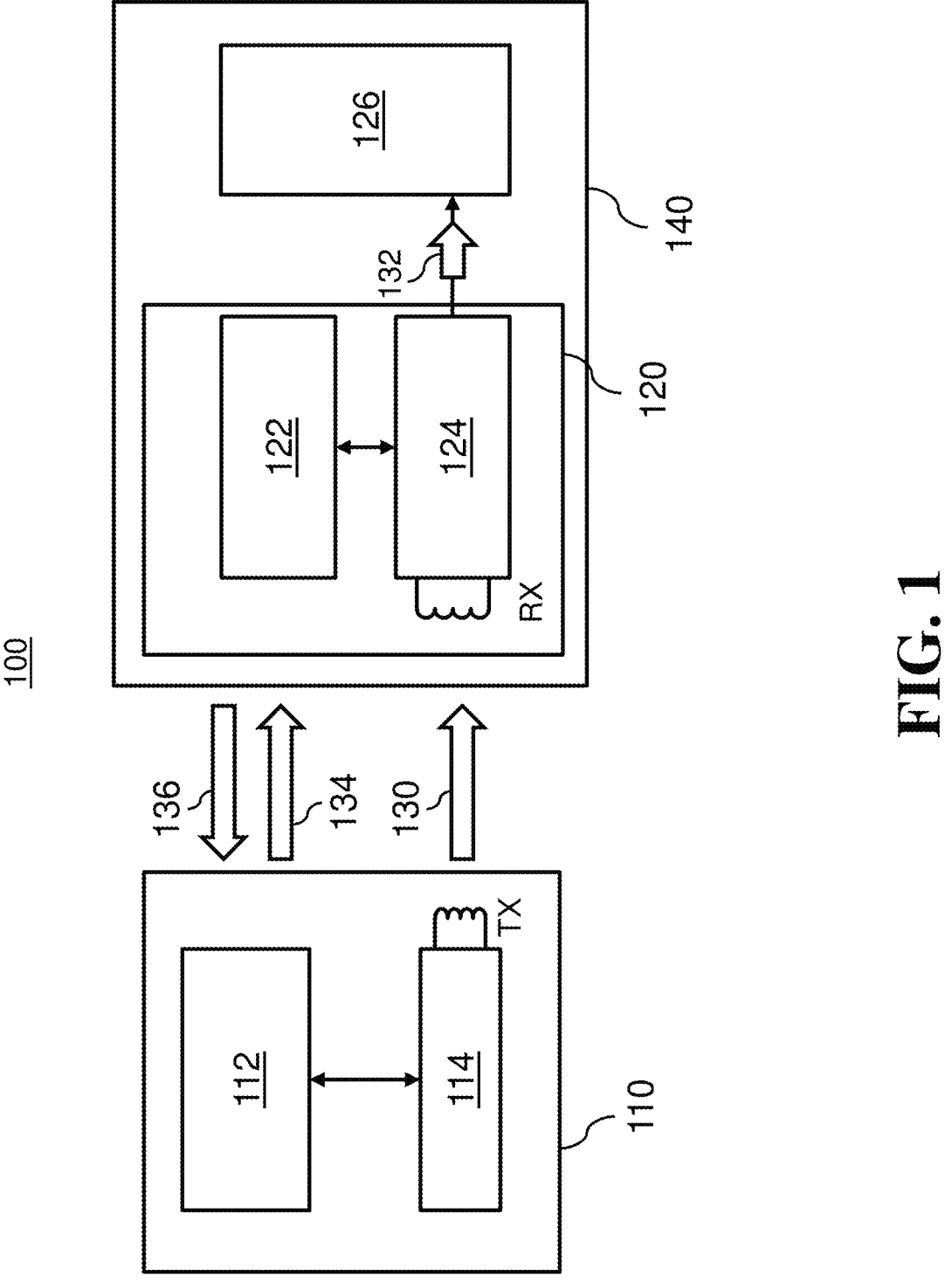
FIG. 1 is a block diagram of an example system for wireless power transfer according to an embodiment.

FIG. 1 is a diagram showing an example system 100 that implements wireless power transfer and communication according to an illustrative embodiment. System 100 comprises a power transmitter 110 and a power receiver 120 that are configured to wirelessly transfer power and data therebetween via inductive coupling. While described herein as power transmitter 110 and power receiver 120, each of power transmitter 110 and power receiver 120 may be configured to both transmit and receive power or data therebetween via inductive coupling.

Power transmitter 110 is configured to receive power from one or more power supplies and to transmit AC power to power receiver 120 wirelessly. For example, power transmitter 110 may be configured for connection to a power supply such as, e.g., an AC power supply or a DC power supply. Power transmitter 110 comprises a controller 112 and a power driver 114.

Controller 112 is configured to control and operate power driver 114. Controller 112 comprises, for example, a processor, central processing unit (CPU), field-programmable gate array (FPGA) or any other circuitry that is configured to control and operate power driver 114. While described as a CPU in illustrative embodiments, controller 112 is not limited to a CPU in these embodiments and may comprise any other circuitry that is configured to control and operate power driver 114. In an example embodiment, controller 112 is configured to control power driver 114 to drive a coil TX of the power driver 114 to produce a magnetic field. Power driver 114 is configured to drive coil TX at a range of frequencies and configurations defined by wireless power standards, such as, e.g., the Wireless Power Consortium (Qi) standard, the Power Matters Alliance (PMA) standard, the Alliance for Wireless Power (A for WP, or Rezence) standard or any other wireless power standards. Controller 112 may be configured as a separate component from power driver 114 or may be included as a part of power driver 114.

Power receiver 120 is configured to receive AC power transmitted from power transmitter 110 and to supply the power to one or more loads 126 or other components of a destination device 140. Destination device 140 may comprise, for example, a computing device, mobile device, mobile telephone, smart device, tablet, wearable device or any other electronic device that is configured to receive power wirelessly. In an illustrative embodiment, destination device 140 comprises power receiver 120. In other embodiments, power receiver 120 may be separate from destination device 140 and connected to destination device 140 via a wire or other component that is configured to provide power to destination device 140.

Power receiver 120 comprises a controller 122 and a power rectifier 124. Controller 122 comprises, for example, a processor, central processing unit (CPU), field-programmable gate array (FPGA) or any other circuitry that may be configured to control and operate power rectifier 124. Power rectifier 124 includes a coil RX and is configured to rectify power received via coil RX into a power type as needed for load 126. For example, power rectifier 124 may be configured to rectify AC power received from coil RX into DC power which may then be supplied to load 126.

As an example, when power receiver 120 is placed in proximity to power transmitter 110, the magnetic field produced by coil TX of power driver 114 induces a current in coil RX of power rectifier 124. The induced current causes AC power 130 to be inductively transmitted from power driver 114 to power rectifier 124. Power rectifier 124 receives AC power 130 and converts AC power 130 into DC power 132. DC power 132 is then provided by power rectifier 124 to load 126. Load 126 may comprise, for example, a battery charger that is configured to charge a battery of the destination device 140, a DC-DC converter that is configured to supply power to a processor, a display, or other electronic components of the destination device 140, or any other load of the destination device 140.

Power transmitter 110 and power receiver 120 are also configured to exchange information or data, e.g., messages, via the inductive coupling of power driver 114 and power rectifier 124. For example, before power transmitter 110 begins transferring power to power receiver 120, a power contract may be agreed upon and created between power receiver 120 and power transmitter 110. For example, power receiver 120 may send communication packets or other data to power transmitter 110 that indicate power transfer information such as, e.g., an amount of power to be transferred to power receiver 120, commands to increase, decrease, or maintain a power level of AC power 130, commands to stop a power transfer, or other power transfer information. In another example, in response to power receiver 120 being brought in proximity to power transmitter 110, e.g., close enough such that a transformer may be formed by coil TX and coil RX to facilitate power transfer, power receiver 120 may be configured to initiate communication by sending a signal to power transmitter 110 that requests a power transfer. In such a case, power transmitter 110 may respond to the request by power receiver 120 by establishing the power contract or beginning power transfer to power receiver 120, e.g., if the power contract is already in place.

Power transmitter 110 and power receiver 120 may transmit and receive communication packets, data or other information via the inductive coupling of coil TX and coil RX. As an example, a communication packet sent from power transmitter 110 to power receiver 120 may comprise frequency shift key (FSK) signals 134. FSK signals 134 are frequency modulated signals that represent digital data using variations in the frequency of a carrier wave. Communication packets sent from power receiver 120 to power transmitter 110 may comprise amplitude shift key (ASK) signals 136. ASK signals 136 are amplitude modulated signals that represent digital data using variations in the amplitude of a carrier wave. While power transmitter 110 is described as sending FSK signals 134 and power receiver 120 is described as sending ASK signals 136, in other embodiments, power receiver 120 may alternatively send FSK signals and power transmitter 110 may alternatively send ASK signals. Any other manner of transmitting communication packets, data or other information between power transmitter 110 and power receiver 120 may alternatively be used.

Figure 2:
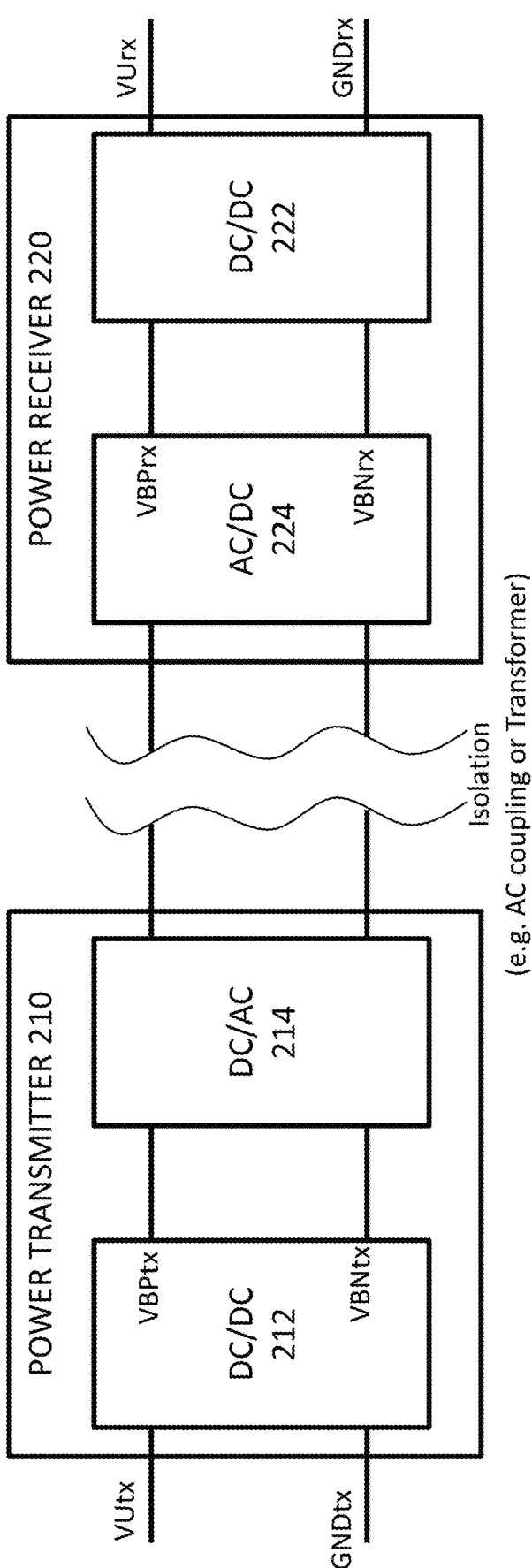
FIG. 2 is a block diagram of the system of FIG. 1 showing example components of a power transmitter and a power receiver according to an embodiment.

With reference now to FIG. 2, an example interface between a power transmitter 210 and power receiver 220 will be described according to an embodiment. Power transmitter 210 and power receiver 220 may comprise similar components and functionality to those described above for power transmitter 110 and power receiver 120.

As shown in FIG. 2, VUtx–GNDtx is a unipolar DC power supply of the power transmitter 210 where GNDtx is the local ground on the transmitter side which may be, for example, 0V or any other value. VUrx-GNDrx is a unipolar DC output power supply of power receiver 220 where GNDrx is the local ground on the receiver side which may be, for example, 0V or another value.

Some wireless power transfer systems specify that no DC component of the power supply should be present at the isolation interface with respect to the local ground, also referred to as nulling the DC component. For example, the average AC voltage at the isolation interface should equal the local ground, e.g., 0V or another value. Such a system may, for example, be satisfied in an embodiment by a unipolar-bipolar conversion that is centered around the local ground.

Power transmitter 210 comprises a DC/DC circuit 212 and a DC/AC circuit 214. DC/DC circuit 212 is configured to convert the unipolar energy received from unipolar DC power supply VUtx–GNDtx to bipolar DC energy having a positive component VBPtx and a negative component VBNtx. VBPtx–VBNtx is a bipolar intermediate DC power supply for DC/AC converter 214 which is configured to convert the bipolar DC energy to AC energy for transfer across the isolation gap to coil RX of power receiver 220, e.g., using coil TX. In an embodiment, the DC component may be nulled according to equation (1):

$$(VBPtx + VBNtx)/2 = GNDtx \qquad (1)$$

Power receiver 220 comprises an AC/DC circuit 224 and a DC/DC circuit 222. AC/DC circuit 224 is configured to receive AC energy from coil RX and convert the received AC energy to bipolar DC energy having a positive component VBPrx and a negative component VBNrx. VBPrx–VBNrx is the bipolar intermediate DC power supply to DC/DC circuit 222 which is configured to convert the bipolar DC energy to unipolar DC energy and output the unipolar DC energy as a DC power supply VUrx-GNDrx. In an embodiment, the DC component may be nulled according to equation (2):

$$(VBPrx + VBNrx)/2 = GNDrx \qquad (2)$$

Figure 3:
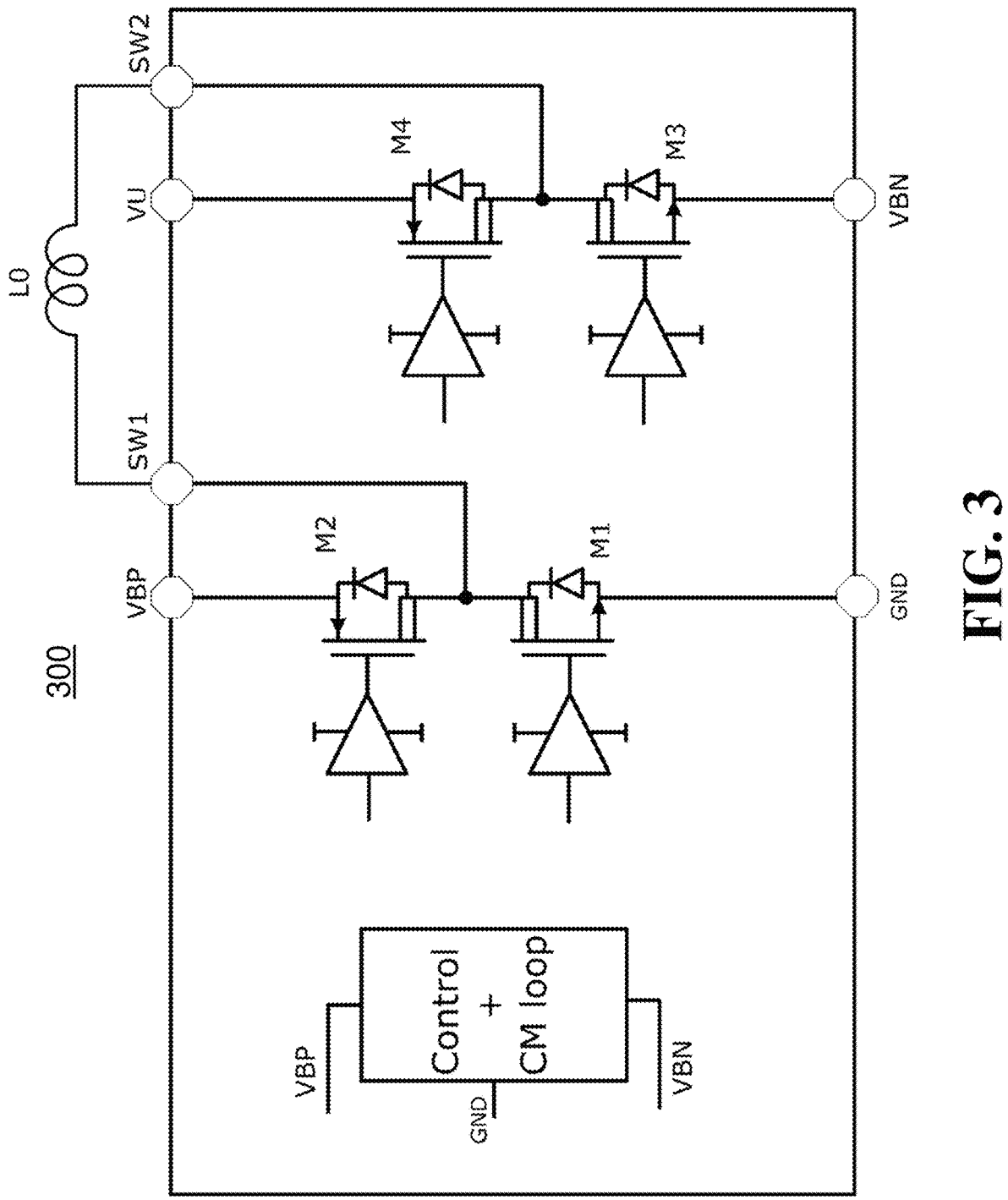
FIG. 3 is a circuit diagram illustrating an example bidirectional unipolar-bipolar DC-DC circuit of the system of FIG. 2 that may be utilized by the power receiver and the power transmitter according to an embodiment.

With reference now to FIG. 3, an example DC/DC circuit 300 that may be utilized to convert between unipolar and bipolar DC energy will now be described according to an embodiment. In an embodiment, DC/DC circuit 330 is bi-directional and may be utilized for either or both of DC/DC circuits 212 (FIG. 2) and 222 (FIG. 2) as will be described in more detail below.

DC/DC circuit 300 is connected to VU, GND, VBP and VBN. As an example, for DC/DC circuit 212, VU may correspond to VUtx, GND may correspond to GNDtx, VBP may correspond to VBPtx and VBN may correspond to VBNtx. Similarly, for DC/DC circuit 222, VU may correspond to VUrx, GND may correspond to GNDrx, VBP may correspond to VBPrx and VBN may correspond to VBNrx.

DC/DC circuit 300 can also utilize an external coil L0 which is connected to DC/DC circuit 300 by connections SW1 and SW2. In some embodiments coil L0 may alternatively be integrated into DC/DC circuit 300.

DC/DC circuit 300 comprises transistors M1, M2, M3 and M4 disposed between VU, GND, VBP, VBN, SW1 and SW2 as shown. Transistors M1, M2, M3 and M4 may comprise any type of transistor commonly utilized in semiconductor devices including, e.g., field-effect transistors (FETS), metal-oxide-semiconductor field-effect transistors (MOS-FETs), bipolar junction transistors (BJTs) or any other transistor or switching technologies. Transistors M1, M2, M3 and M4 may be controlled by corresponding control circuits such as, e.g., power drivers, e.g., using pulse-width modulation or another type of signal.

As shown in FIG. 3, transistor M1 is connected to GND, transistor M2 is connected to VBP, transistor M3 is connected to VBN and transistor M4 is connected to VU. SW1 is connected between transistors M1 and M2 while SW2 is connected between transistors M3 and M4.

Transistors M1, M2, M3 and M4 are configured to control the flow of energy through coil L0 during the conversion between unipolar DC energy and bipolar DC energy. For example, depending on the activation state of each transistor M1, M2, M3, M4, current may flow in a particular direction through coil L0 and along a particular path within DC/DC circuit 300 to achieve the corresponding conversion in a reversible manner.

In an example embodiment, M1 may comprise a 5V n-type transistor, M2 may comprise a 5V p-type transistor, M3 may comprise 12V n-type transistor and M4 may comprise a 12V p-type transistor. In such an embodiment, the power supply VU-GND may have a value of 5V with VBP having a value of +6V and VBN having a value of −6V. Any other values for the power supply, VBP, VBN and transistors M1, M2, M3 and M4 may alternatively be utilized.

Figure 4:
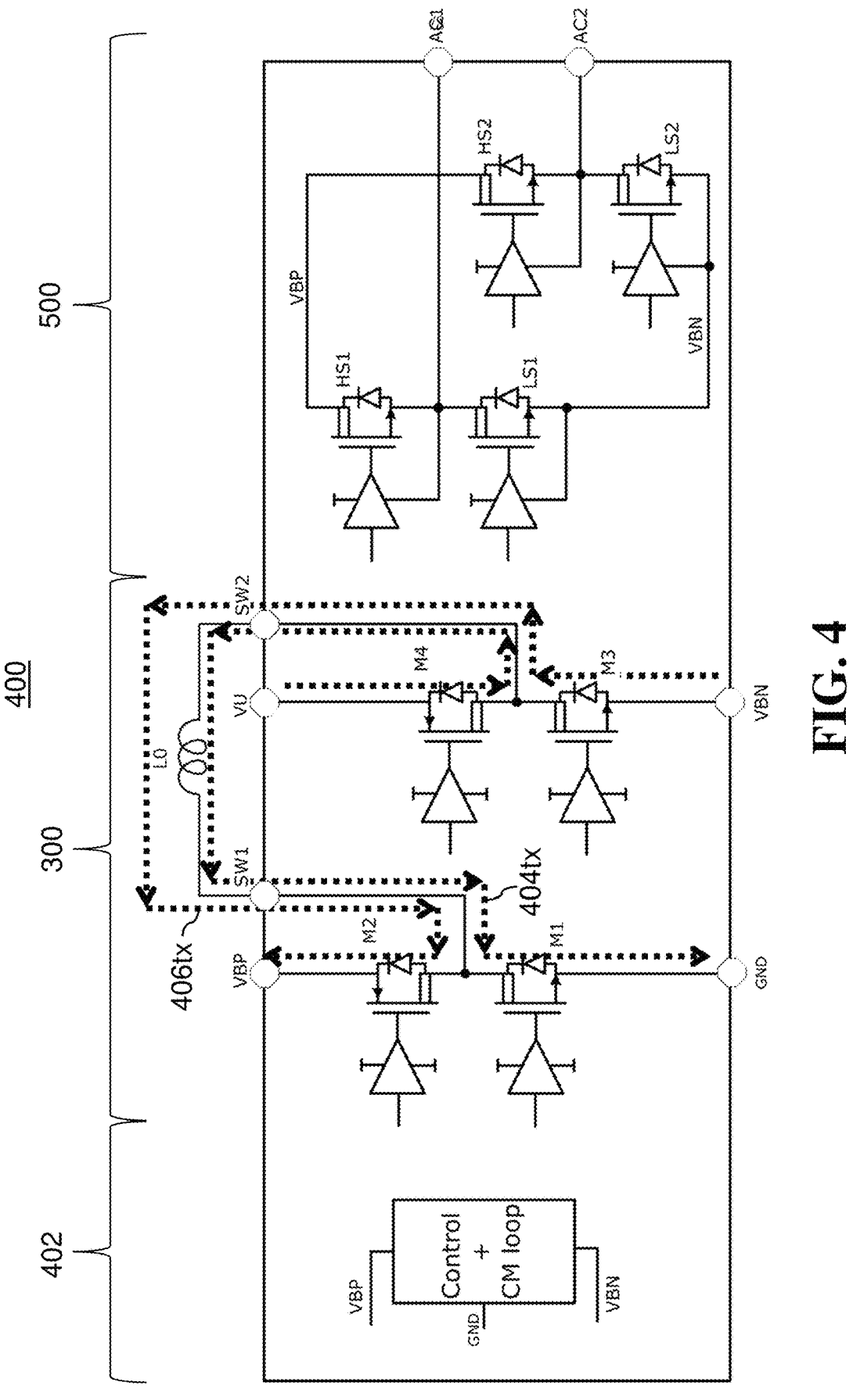
FIG. 4 is a circuit diagram illustrating an example bidirectional power transmitter/receiver circuit of the system of FIG. 2 that may be utilized by the power receiver and the power transmitter, also showing unipolar-bipolar DC-DC conversion flow paths during power transmission according to an embodiment.
Figure 5:
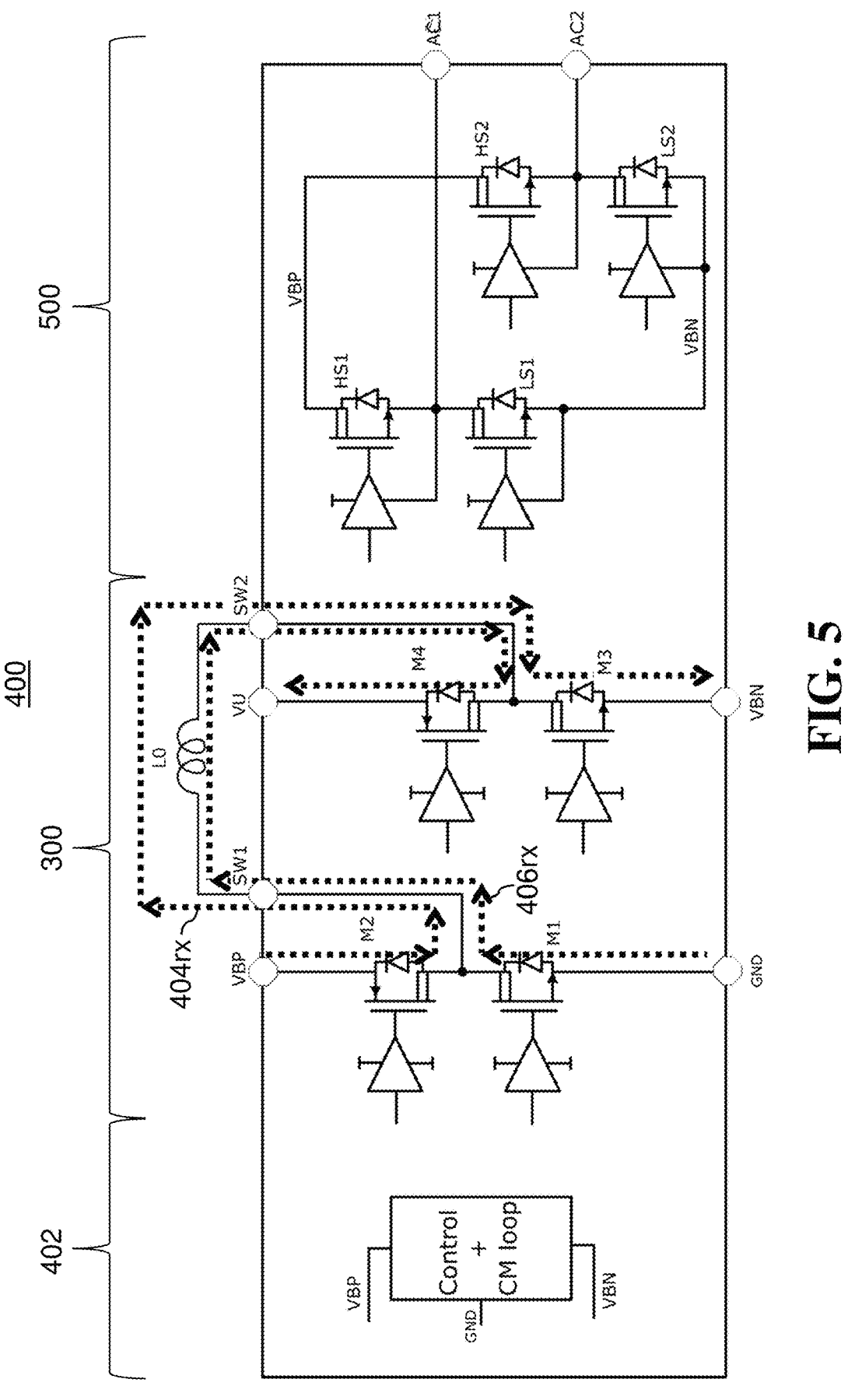
FIG. 5 is a circuit diagram illustrating the bidirectional power transmitter/receiver circuit of FIG. 5 showing unipolar-bipolar DC-DC conversion flow paths during power reception according to an embodiment.

With reference to FIGS. 4 and 5, DC/DC circuit 300 is shown integrated into a bidirectional power transmitter/receiver circuit 400 along with an inverter/rectifier circuit 500. Either or both of power transmitter 210 and power receiver 220 may comprise a corresponding bidirectional power transmitter/receiver circuit 400 which is configured to perform conversions between AC energy, DC bipolar energy and DC unipolar energy in either direction on the same silicon.

Bidirectional power transmitter/receiver circuit 400 comprises a control and common-mode (CM) loop circuit 402 that is configured to finely control the symmetric bipolar behavior of DC/DC circuit 300. Some or all of the functionality of control and CM loop 402 may be executed by controller 112 (FIG. 1), controller 122 or another processing device. In some embodiments the control and CM loop 402 is configured to consume little to no power when circuit 300 is at a steady state.

Inverter/rectifier circuit 500 is configured to perform the conversion between bipolar DC energy and AC energy in either direction for power transmitter 210 or power receiver 220. Inverter/rectifier circuit 500 comprises transistors HS1, LS1, HS2 and LS2 connected to VBP, VBN, AC1 and AC2 as shown. Transistors HS1, LS1, HS2 and LS2 may comprise any type of transistor described above for transistors M1, M2, M3 and M4. The AC1 and AC2 connections connect to coil TX or coil RX respectively. Transistor HS1 is disposed between VBP and AC1, transistor HS2 is disposed between VBP and AC2, transistor LS1 is disposed between VBN and AC1 and transistor LS2 is disposed between VBN and AC2. Transistors HS1, LS1, HS2 and LS2 are selectively activated to convert the bipolar DC power supply VBP-VBN to an AC output for transmission between coil TX and coil RX, e.g., generating two symmetrical square waves on AC1 and AC2 in some embodiments.

FIG. 4 illustrates an example flow of DC/DC circuit 300 during power transmission, e.g., when bidirectional power transmitter/receiver circuit 400 functions as a power transmitter 210, also referred to herein as TX mode. During TX mode, DC/DC circuit 300 is supplied with VU referenced to GND. Transistors M1, M2, M3 and M4 function as a single inductor, dual output (SIDO) that performs the DC-DC conversion and unipolar-to-bipolar conversion.

The TX mode conversion comprises a two-stage process. At the first stage, coil L0 is magnetized by turning on transistors M4 and M1 as shown by flow path 404tx. The current flows from VU through transistor M4 to SW2, through coil L0 to SW1, and through transistor M1 to GND. The current flow magnetizes coil L0, allowing coil L0 to store energy. Once coil L0 is sufficiently energized, M4 and M1 may be turned off. In other embodiments, current may flow from GND to VU to energize coil L0, e.g., if a negative voltage is supplied by VU or GND has a reference value that is greater than the voltage supplied by VU.

At the second stage, coil L0 is demagnetized, and the stored energy is dumped to VBP-VBN by turning on transistors M3 and M2 as shown by flow path 406tx. The current flows from VBN through transistor M3 to SW2, through coil L0 to SW1, and through transistor M2 to VBP, increasing the voltage of VBP while simultaneously decreasing the voltage of VBN until coil L0 is fully demagnetized. In this manner positive voltage on VBP may be balanced with the negative voltage on VBN. In TX mode, inverter/rectifier 500 functions as an inverter and converts the bipolar DC energy supplied by VBP-VBN to AC energy for output by AC1 and AC2, e.g., as symmetrical rectangular waves. The TX mode two-stage process may be repeated as needed to continue supplying VBP and VBN to inverter/rectifier 500 for DC-AC conversion.

FIG. 5 illustrates an example flow of DC/DC circuit 300 during power reception, e.g., when bidirectional power transmitter/receiver circuit 400 functions as a power receiver 220, also referred to herein as RX mode. During RX mode, inverter/rectifier circuit 500 is operated as a rectifier to generate VBP and VBN from AC energy received from coil RX. Transistors M1, M2, M3 and M4 function as a bipolar input, unipolar output DC-DC converter that performs the DC-DC conversion and bipolar-to-unipolar conversion.

The conversion comprises a two-stage process. At the first stage, coil L0 is magnetized by turning on transistors M2 and M3 as shown by flow path 404rx. The current flows from VBP through transistor M2 to SW1, through coil L0 to SW2, and through transistor M3 to VBN, decreasing the voltage of VBP while simultaneously increasing the voltage of VBN. The current flow magnetizes coil L0, allowing coil L0 to store energy.

At the second stage, coil L0 is demagnetized or dumped to VU-GND by turning on transistors M4 and M1 as shown by flow path 406rx. The current flows from GND through transistor M1 to SW1, through coil L0 to SW2, and through transistor M4 to VU, increasing the voltage of VU until coil L0 is fully demagnetized or discharged. In this manner unipolar DC energy power supply VU-GND may be generated for output to load 126 (FIG. 1). The two-stage RX mode process may be repeated as needed to continue outputting the unipolar DC energy power supply VU-GND.

During the TX mode process and the RX mode process, controllers 112 and 122 utilize the control and CM loop 402 to ensure that (VBP+VBN)/2=GND.

Figure 6:
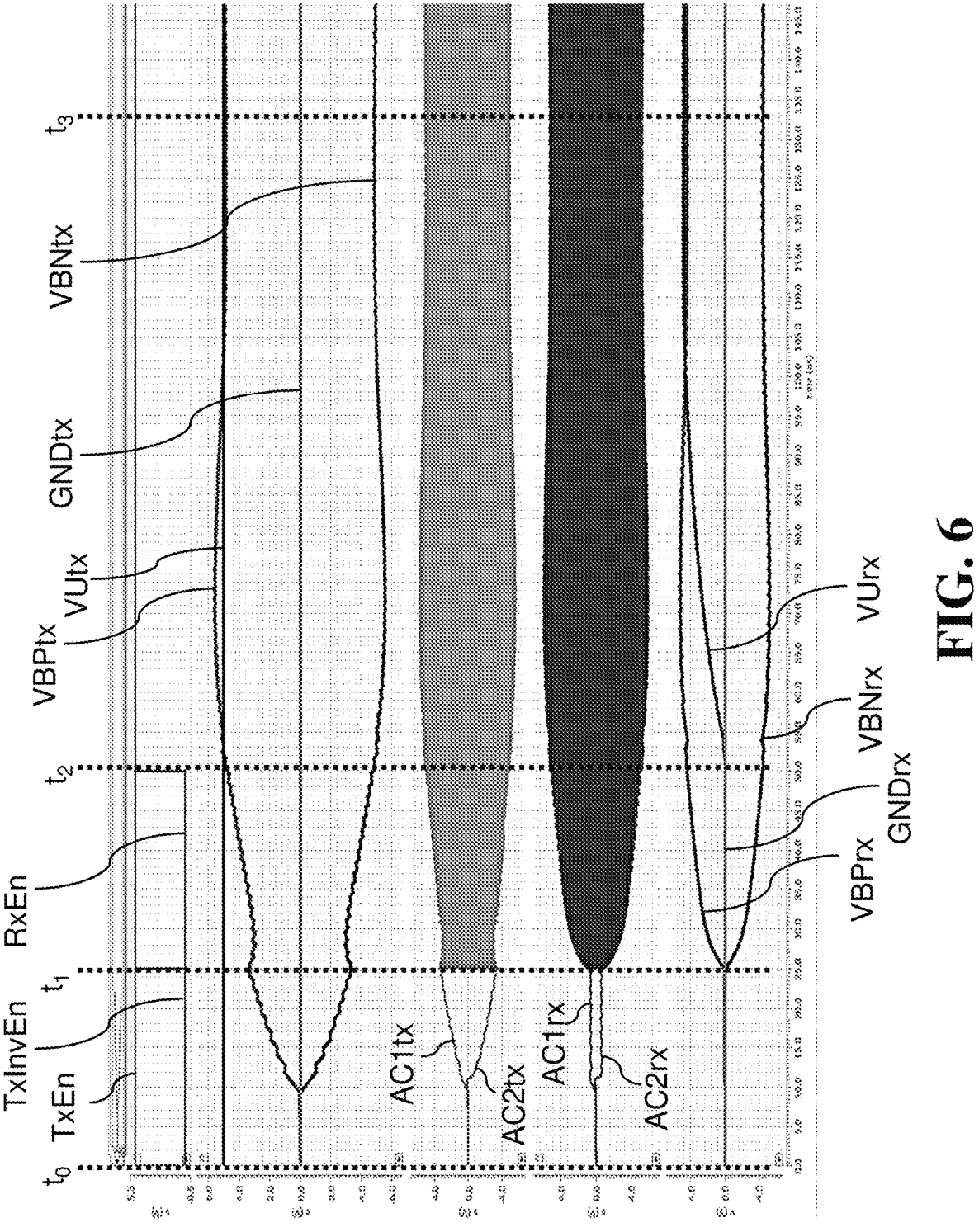
FIG. 6 is a signal diagram illustrating signals associated with the bidirectional power transmitter/receiver circuit of FIG. 5 during both power transmission and power reception according to an embodiment.

With reference to FIG. 6, an example signal diagram 600 of a TX mode process and a RX mode process will now be described. The TX mode process is performed by a power transmitter 210 comprising a bidirectional power transmitter/receiver circuit 400 and the RX mode process is performed by a power receiver 220 comprising another bidirectional power transmitter/receiver circuit 400.

Signal diagram 600 illustrates the TX mode and RX mode processes from timestamps $t_0$-$t_3$. At time to, a TX DC-DC enable signal TxEn is set to high, initializing the TX side DC/DC circuit 300 to begin converting energy from the unipolar power supply VUtx-GNDtx to bipolar power supply VBPtx-VBNtx, also referred to as a soft start of VBPtx-VBNtx. At time to, a TX inverter enable signal TxInvEn that controls activation of the TX side inverter/rectifier circuit 500 is set to low and the inverter is not active.

On the RX side, at time to, a RX DC-DC enable signal RxEn that controls activation of the RX side DC/DC circuit 300 is also set to low and the RX side DC/DC circuit 300 is not yet converting bipolar DC power from RX side inverter/rectifier circuit 500 to unipolar DC power.

Initially at time to, VUtx is equal to a target voltage, e.g., 5V, and VBPtx, GNDtx, VBNtx, AC1tx and AC2tx are all 0V (or equal to a reference voltage). TX side DC/DC circuit 300 has not yet begun converting VUtx-GNDtx from unipolar DC energy to bipolar DC energy supply VBPtx-VBNtx and no power is being transferred to power receiver 220. VUrx, VBPrx, GNDrx, VBNrx, ACrtx and AC2rx are all 0 since no power has been received from power transmitter 210.

Between time $t_0$ and time $t_1$, because TxEn is set to high, the TX side DC/DC circuit 300 begins converting the unipolar power supply VUtx-GNDtx to bipolar power supply VBPtx-VBNtx in a soft start. Due to TX side DC/DC circuit 300, VBPtx begins increasing while VBNtx simultaneously begins decreasing, ensuring that (VBPtx+VBNtx)/2=GNDtx. AC1tx and AC2tx also become powered by the TX side inverter rectifier circuit 500 in a soft start.

At time $t_1$, TxInvEn is set to high, activating the TX side inverter/rectifier circuit 500 to pass the generated AC power supply output for AC1tx and AC2tx to coil TX. RxEn is still held low.

Between time $t_1$ and $t_2$, VBPtx and VBNtx each dip toward GNDtx as TX side inverter/rectifier circuit 500 begins passing the AC power supply output converted from the bipolar DC power supply VBPtx-VBNtx into to coil TX before continuing to rise and eventually level out after times $t_2$ and $t_3$ with |VBPtx|=|VBNtx|=|VUtx|. As seen by the shaded region in FIG. 6, AC1tx and AC2tx are driven by TX side inverter/rectifier circuit 500 to output symmetrical rectangular waves that begin powering coil TX to transfer AC energy to coil RX. AC1tx and AC2tx may be driven to a target frequency, e.g., 6.78 MHz or another frequency value.

Between time $t_1$ and $t_2$, AC1rx and AC2rx receive AC energy from coil RX and RX side inverter/rectifier circuit 500 ramps up the conversion of the AC energy to bipolar DC power supply VBPrx-VBNrx and generates VBPrx and VBNrx symmetrically. Since RxEn is not yet enabled, RX side DC/DC circuit 300 does not yet begin converting the bipolar DC power supply VBPrx-VBNrx to unipolar DC power supply VUrx-GNDrx and VUrx stays at 0V.

At time $t_2$, RxEn is set to high and RX side DC/DC circuit 300 begins converting the bipolar DC power supply VBPrx–VBNrx to unipolar DC power supply VUrx-GNDrx as shown by VUrx increasing. By time $t_3$, |VUrx|=|VBPrx|=VBNrx| and power is being transferred between power transmitter 210 and power receiver 220.

Figure 7:
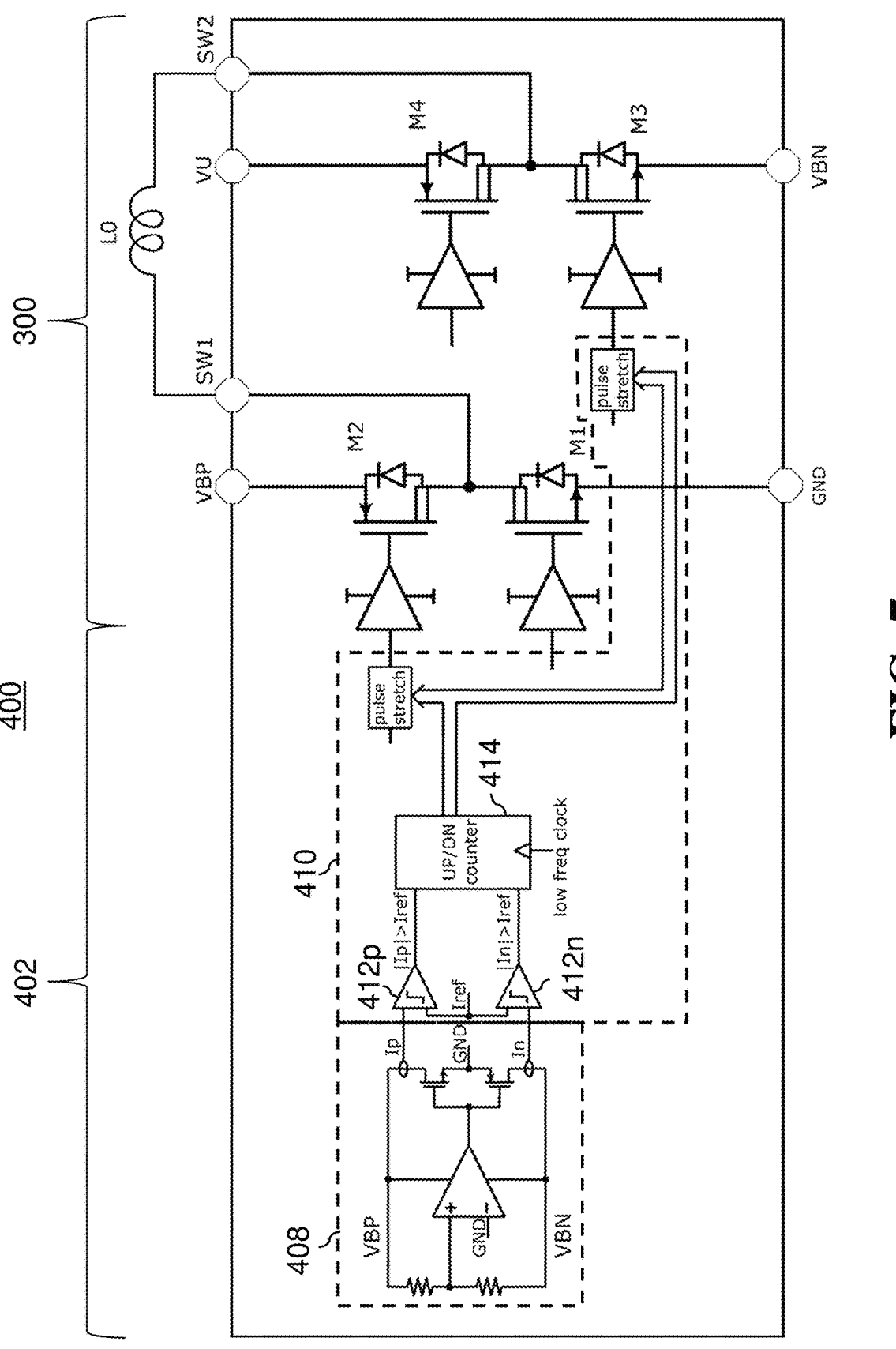
FIG. 7 is a circuit diagram illustrating a control and common mode loop circuit of the bidirectional power transmitter/receiver circuit of FIG. 5 according to an embodiment.

With reference to FIG. 7, example control and CM loop 402 functionality will now be described. During conversion and power transfer, bidirectional power transmitter/receiver circuit 400 may need to precisely control the common mode. For example, in an embodiment, the precise control may be configured to ensure that VBP=|VBN|. This may be especially important when on the RX side where a bidirectional power transmitter/receiver circuit 400 operating in the RX mode is rectifying the received AC energy AC1$rx$ and AC2$rx$ into DC bipolar power supply VBPrx–VBNrx and then converting that to DC unipolar power supply VUrx-GNDrx. In an ideal conversion, the current consumption from VBP should be perfectly balanced with the current consumption from VBN on both the TX and RX sides. Such balancing of the current of VBP and VBN is accomplished through the use of a CM loop in an embodiment.

A typical linear (analog) CM loop typically seeks to sink any mismatch between the VBP and VBN currents to GND to ensure the symmetry at the cost of power consumption and efficiency loss. In an embodiment, as shown in FIG. 7, a digitally assisted common mode loop is disclosed that inhibits or reduces the efficiency loss associated with sinking the mismatch.

FIG. 7 illustrates an example control and CM loop 402 that may be used for the RX mode of bidirectional power transmitter/receiver circuit 400 although the same functionality may also be applied for TX mode.

Control and CM loop 402 comprises a linear CM loop 408 that is configured to ensure that VBP and VBN are symmetrical, e.g., VBP=|VBN|, even at high frequency with any mismatch on the currents for VBP and VBN being compensated by either a current Ip or a current In. Control and CM loop 402 also comprises a digital control loop 410 that is configured to maintain Ip and In within a certain window at steady state, e.g., |Ip|<Iref and |In|<a reference current Iref). In some embodiments, linear CM loop 408 is configured to operate at a higher frequency than digital control loop 410 with the bandwidth of control and CM loop 402 being controlled by the frequency of a low frequency clock connected to a UP/DN counter 414 of digital control loop 410.

During operation of control and CM loop 402, current values Ip and In from linear CM loop 408 are sampled by digital control loop 410. Comparators 412$p$ and 412$n$ are configured to respectively compare the sampled Ip and In current values to a reference current Iref. Comparator 412$p$ is configured to output a determination of whether or not an absolute value of Ip is greater than Iref and comparator 412$n$ is configured to output a determination of whether or not an absolute value of In is greater than Iref. As an example, in some embodiments, the output of comparator 412$p$ may be simplified to a determination of whether or not Ip is greater than Iref while the output of comparator 412$n$ may be simplified to a determination of whether or not Iref is greater than In.

The outputs of comparators 412$p$ and 412$n$ are provided as inputs to an UP/DOWN (UP/DN) counter 414. UP/DN counter 414 is configured to adjust the pulse lengths of the on-time control signals provided to the control circuitry of transistors M1, M2, M3 and M4 depending on the values received from comparators 412$p$ and 412$n$ and depending on which mode, TX or RX, bidirectional power transmitter/receiver circuit 400 is operating in. For example, UP/DN counter 414 may increment (e.g., stretch) the pulse lengths, decrement (e.g., shrink) the pulse lengths or adjust the pulse lengths in any other manner. Incrementing the pulse length increases the on-time for the corresponding transistor M1, M2, M3 or M4 while decrementing the pulse length decreases the on-time for the corresponding transistor M1, M2, M3 or M4. In some embodiments, the pulse lengths may have a minimum value below which UP/DN counter 414 will not decrement, ensuring a minimum on-time for the corresponding transistors. In some embodiments, transistors M1, M2, M3 and M4 initialize with predetermined on-time pulse lengths. As an example, the on-time pulse length for transistors M1 and M4 may initially be equal. Similarly, the on-time pulse length for transistors M2 and M3 may be initially equal.

As an example, in RX mode, as shown in FIG. 7, UP/DN counter 414 is configured to increment the pulse length of the control signal for transistor M2 if |Ip|>Iref and to increment the pulse length of the control signal for transistor M3 if |In|>Iref. Similarly, UP/DN counter 414 is configured to decrement the pulse length of the control signal for transistor M2 if |Ip|<=Iref and to decrement the pulse length of the control signal for transistor M3 if |In|<=Iref. These increments and decrements of the pulse length may be performed independent of each other by UP/DN counter 414 based on the values of Ip and In. In some embodiments, the mismatch in on-times between transistors M2 and M3 serve to drive any current mismatch between |Ip| and |In| toward Iref.

As another example, in TX mode, UP/DN counter 414 is configured to increment the pulse length of the control signal for transistor M1 if |Ip|>Iref and to increment the pulse length of the control signal for transistor M4 if |In|>Iref. Similarly, UP/DN counter 414 is configured to decrement the pulse length of the control signal for transistor M1 if |Ip|<=Iref and to decrement the pulse length of the control signal for transistor M4 if |In|<=Iref. These increments and decrements of the pulse length may be performed independent of each other by UP/DN counter 414 based on the values of Ip and In.

Figure 8:
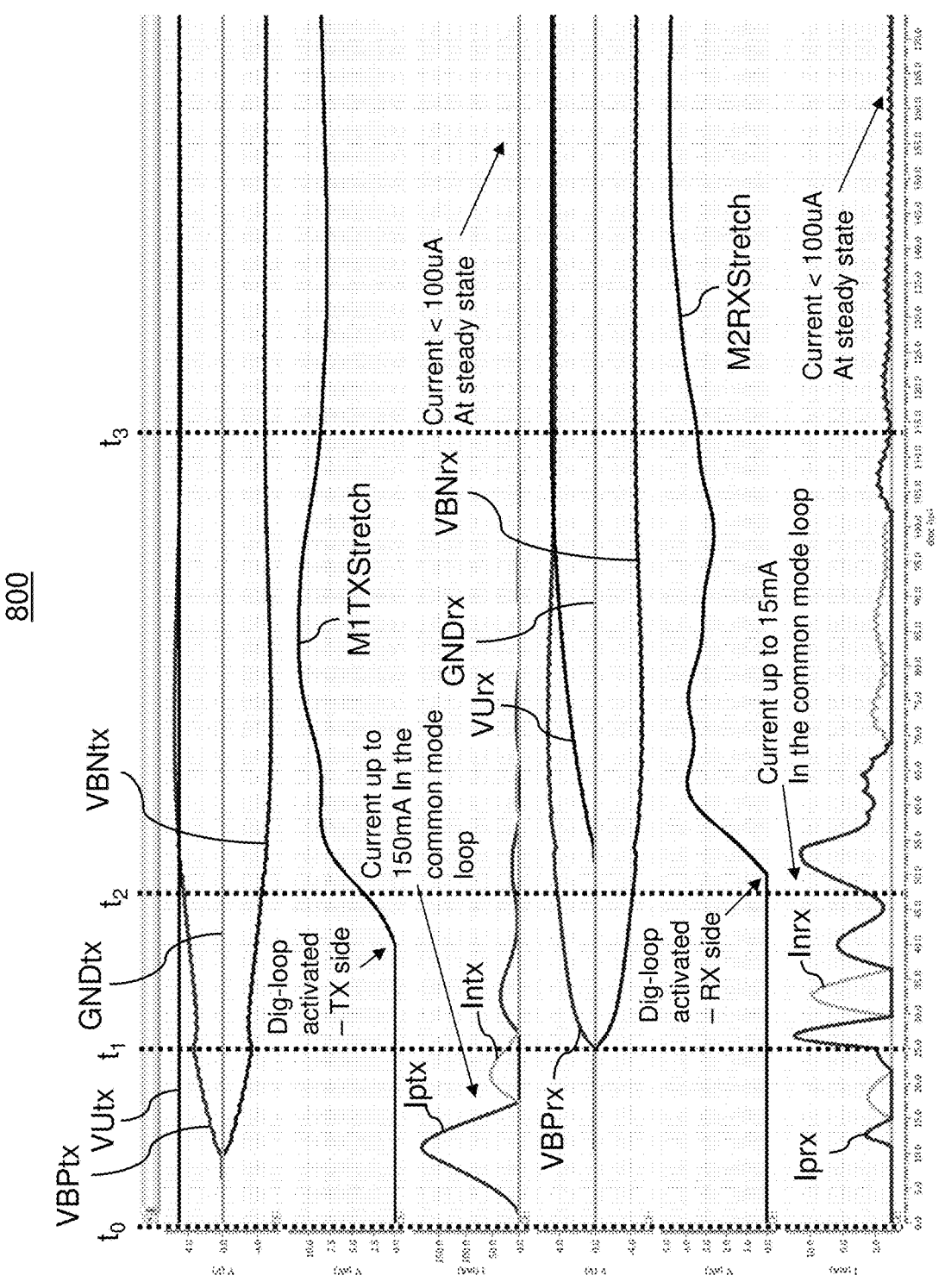
FIG. 8 is a signal diagram illustrating signals associated with the bidirectional power transmitter/receiver circuit of FIG. 5 during both power transmission and power reception including precision control by the control and common mode loop circuit of FIG. 7 according to an embodiment.

With reference to FIG. 8, an example signal diagram 800 of a TX mode process and a RX mode process including the function of control and CM loop 402 will now be described. The TX mode process is performed by a power transmitter 210 comprising a bidirectional power transmitter/receiver circuit 400 and the RX mode process is performed by a power receiver 220 comprising another bidirectional power transmitter/receiver circuit 400.

Signal diagram 800 illustrates the TX mode and RX mode processes from timestamps $t_0$-$t_3$. Initially at time to, VUtx is equal to a target voltage, e.g., 5V, and VBPtx, GNDtx, VBNtx are all 0V (or equal to a reference voltage), Iptx and Intx are at OA. TX side DC/DC circuit 300 has not yet begun converting VUtx–GNDtx from unipolar DC energy to bipolar DC energy supply VBPtx–VBNtx and no power is being transferred to power receiver 220. VUrx, VBPrx, GNDrx, VBNrx are all 0V (or equal to a reference voltage), Iprx and Inrx are at OA since no power has been received from power transmitter 210. The M1TXStretch and M2RXStretch signals are equal to 0, indicating that there is no pulse length increment or decrement active on the TX side for transistor M1 and there is no pulse length increment active on the RX side for transistor M2. Note that the units of M1TXStretch and M2RXStretch are in nV where, for example, InV is equivalent to a Ins increase or decrease in pulse length.

Between time $t_0$ and time $t_1$, the TX side DC/DC circuit 300 begins converting the unipolar power supply VUtx–GNDtx to bipolar power supply VBPtx–VBNtx in a soft start. Due to TX side DC/DC circuit 300, VBPtx begins increasing while VBNtx simultaneously begins decreasing, ensuring that (VBPtx+VBNtx)/2=GNDtx. The values of Iptx and Intx also spike with the activation of TX side DC/DC circuit 300, with Iptx going as high as 150 mA in this example.

Between time $t_1$ and $t_2$, VBPtx and VBNtx each dip toward GNDtx as TX side inverter/rectifier circuit 500 begins passing the AC power supply output converted from the bipolar DC power supply VBPtx–VBNtx into to coil TX before continuing to rise and eventually level out after times $t_2$ and $t_3$ with |VBPtx|=|VBNtx|=|VUtx|. The TX side digital control loop 410 also determines that |Iptx| is greater than Iref and begins incrementing M1TXStretch to increase the on-time for transistor M1 in order to drive the currents back down to Iref. As seen after time $t_3$, |Iptx| and |Intx| are both at a steady state close to Iref, e.g., less than 100 μA Between time $t_1$ and $t_2$, RX side inverter/rectifier circuit 500 ramps up the conversion of the AC energy to bipolar DC power supply VBPrx–VBNrx and generates VBPrx and VBNrx symmetrically. Iprx and Inrx also spike, e.g., as high as 15 mA.

At time $t_2$, RX side DC/DC circuit 300 begins converting the bipolar DC power supply VBPrx–VBNrx to unipolar DC power supply VUrx-GNDrx as shown by VUrx increasing between times $t_2$ and $t_3$. By time $t_3$, |VUrx|=|VBPrx|=VBNrx| and power is being transferred between power transmitter 210 and power receiver 220.

Between times $t_2$ and $t_3$, the RX side digital control loop 410 also determines that |Iprx| is greater than Iref and begins incrementing M2RXStretch to increase the on-time for transistor M2 in order to drive the currents back down toward Iref. As shown after $t_3$, the currents on Iprx and Inrx are at a steady state close to Iref, e.g., less than 100 μA.

By providing a bidirectional power transmitter/receiver circuit 400 having a unipolar-bipolar DC/DC circuit that is controlled a control and CM circuit comprising linear common mode and digital control components, the disclosed embodiments compensate for asymmetric current consumption from VBP and VBN through manipulation of the on-times for the transistors performing the unipolar-bipolar DC-DC conversion. The disclosed embodiments can enhance the efficiency of the power transmission and power reception circuits, reducing power loss in the conversion by removing the need to sink any mismatch between VBP and VBN on both the TX and RX sides. The disclosed embodiments further ensure that no DC component with respect to local ground is present at the isolation interface. The disclosed bidirectional power transmitter/receiver circuit 400 comprises a unipolar-bipolar DC-DC circuit 300 that is usable for both TX and RX modes, enabling the use of the same silicon configuration for both TX and RX modes which simplifies the production process, optimizes production costs and reduces time to market.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A semiconductor device comprising:
    a bidirectional unipolar-bipolar DC-DC circuit comprising:
        a first transistor, the first transistor being connected between a reference ground connection and a first connection of a coil;
        a second transistor, the second transistor being connected between a positive bipolar input/output connection and the first connection of the coil;
        a third transistor, the third transistor being connected between a second connection of the coil and a negative bipolar input/output connection; and
        a fourth transistor, the fourth transistor being connected between the second connection of the coil and a unipolar voltage input/output connection, the bidirectional unipolar-bipolar DC-DC circuit being configured to concurrently activate the second and third transistors to cause a current flow through the coil between the positive bipolar input/output connection and the negative bipolar input/output connection; and
    a control and common mode circuit configured to adjust an on-time pulse length of at least one of the first, second, third and fourth transistors, wherein the control and common mode circuit comprises:
        a linear common mode loop that is configured to maintain a symmetry relative to the reference ground connection between the positive bipolar input/output connection and the negative bipolar input/output connection; and
        a digital control loop that is configured to adjust the on-time pulse length of the at least one of the first, second, third and fourth transistors to drive an absolute value of a first current corresponding to the positive bipolar input/output connection and an absolute value of a second current corresponding to the negative bipolar input/output connection below a predetermined reference current value.

2. The semiconductor device of claim 1, wherein the bidirectional unipolar-bipolar DC-DC circuit, when in a power transmission mode, is configured to:
    concurrently activate the first and fourth transistors to magnetize the coil by current flow from the unipolar voltage input/output connection to the reference ground connection; and
    concurrently activate the second and third transistors to demagnetize the coil by current flow from the negative bipolar input/output connection to the positive bipolar input/output connection, the demagnetization simultaneously generating a positive voltage on the positive bipolar input/output connection and a negative voltage on the negative bipolar input/output connection.

3. The semiconductor device of claim 1, wherein the bidirectional unipolar-bipolar DC-DC circuit, when in a power reception mode, is configured to:

concurrently activate the second and third transistors to magnetize the coil by current flow from the positive bipolar input/output connection to the negative bipolar input/output connection; and concurrently activate the first and fourth transistors to demagnetize the coil by current flow from the reference ground connection to the unipolar voltage input/output connection.

4. The semiconductor device of claim 1, wherein the digital control loop is configured to:

increase the on-time pulse length of a corresponding one of the first, second, third and fourth transistors based on the first current being greater than the predetermined reference current value; and increase the on-time pulse length of a corresponding one of the first, second, third and fourth transistors based on the second current being greater than the predetermined reference current value.

5. The semiconductor device of claim 1, wherein the digital control loop comprises an up/down counter, the up/down counter being configured to increment and decrement the on-time pulse length corresponding to the at least one of the first, second, third and fourth transistors based on a comparison of the absolute value of the first current to the predetermined reference current value.

6. The semiconductor device of claim 1, wherein the linear common mode loop operates at a frequency greater than the digital control loop.

7. The semiconductor device of claim 6, wherein the digital control loop comprises a low frequency clock, the low frequency clock being adjustable to adjust a operating frequency of the digital control loop.

8. A semiconductor device comprising:

a bidirectional unipolar-bipolar DC-DC circuit comprising:

a first transistor, the first transistor being connected between a reference ground connection and a first connection of a coil;

a second transistor, the second transistor being connected between a positive bipolar input/output connection and the first connection of the coil;

a third transistor, the third transistor being connected between a second connection of the coil and a negative bipolar input/output connection; and a fourth transistor, the fourth transistor being connected between the second connection of the coil and a unipolar voltage input/output connection; and a control and common mode circuit comprising:

a linear common mode loop that is configured to maintain a symmetry relative to the reference ground connection between the positive bipolar input/output connection and the negative bipolar input/output connection; and a digital control loop that is configured to adjust an on-time pulse length of the at least one of the first, second, third and fourth transistors to drive an absolute value of a first current corresponding to the positive bipolar input/output connection and an absolute value of a second current corresponding to the negative bipolar input/output connection below a predetermined reference current value.

9. The semiconductor device of claim 8, wherein the bidirectional unipolar-bipolar DC-DC circuit, when in a power transmission mode, is configured to:

concurrently activate the first and fourth transistors to magnetize the coil by current flow from the unipolar voltage input/output connection to the reference ground connection; and concurrently activate the second and third transistors to demagnetize the coil by current flow from the negative bipolar input/output connection to the positive bipolar input/output connection, the demagnetization simultaneously generating a positive voltage on the positive bipolar input/output connection and a negative voltage on the negative bipolar input/output connection.

10. The semiconductor device of claim 8, wherein the bidirectional unipolar-bipolar DC-DC circuit, when in a power reception mode, is configured to:

concurrently activate the second and third transistors to magnetize the coil by current flow from the positive bipolar input/output connection to the negative bipolar input/output connection; and concurrently activate the first and fourth transistors to demagnetize the coil by current flow from the reference ground connection to the unipolar voltage input/output connection.

11. The semiconductor device of claim 8, wherein the digital control loop is configured to:

increase the on-time pulse length of a corresponding one of the first, second, third and fourth transistors based on the first current being greater than the predetermined reference current value; and increase the on-time pulse length of a corresponding one of the first, second, third and fourth transistors based on the second current being greater than the predetermined reference current value.

12. The semiconductor device of claim 8, wherein the digital control loop comprises an up/down counter, the up/down counter being configured to increment and decrement the on-time pulse length of the at least one of the first, second, third and fourth transistors based on a comparison of the absolute value of the first current to the predetermined reference current value.

13. The semiconductor device of claim 8, wherein the linear common mode loop operates at a frequency greater than the digital control loop.

14. The semiconductor device of claim 13, wherein the digital control loop comprises a low frequency clock, the low frequency clock being adjustable to adjust a operating frequency of the digital control loop.

15. A semiconductor device comprising:

a bidirectional unipolar-bipolar DC-DC circuit comprising:

a first transistor, the first transistor being connected between a reference ground connection and a first connection of a coil;

a second transistor, the second transistor being connected between a positive bipolar input/output connection and the first connection of the coil;

a third transistor, the third transistor being connected between a second connection of the coil and a negative bipolar input/output connection; and a fourth transistor, the fourth transistor being connected between the second connection of the coil and a unipolar voltage input/output connection, the bidirectional unipolar-bipolar DC-DC circuit being configured to concurrently activate the second and third transistors to cause a current flow through the coil between the positive bipolar input/output connection and the negative bipolar input/output connection;

a bidirectional inverter/rectifier circuit connected to the positive bipolar input/output connection, the negative bipolar input/output connection, a first AC connection and a second AC connection, the bidirectional inverter/rectifier circuit being configured to convert energy between a bipolar DC power supply defined by the positive bipolar input/output connection and the negative bipolar input/output connection, and an AC power supply defined by the first and second AC connections; and a control and common mode circuit comprising:

a linear common mode loop that is configured to maintain a symmetry relative to the reference ground connection between the positive bipolar input/output connection and the negative bipolar input/output connection; and a digital control loop that is configured to adjust an on-time pulse length of the at least one of the first, second, third and fourth transistors to drive an absolute value of a first current corresponding to the positive bipolar input/output connection and an absolute value of a second current corresponding to the negative bipolar input/output connection below a predetermined reference current value.

16. The semiconductor device of claim 15, wherein:

the linear common mode loop operates at a frequency greater than the digital control loop; and the digital control loop comprises a low frequency clock, the low frequency clock being adjustable to adjust a operating frequency of the digital control loop.

17. The semiconductor device of claim 15, wherein the bidirectional unipolar-bipolar DC-DC circuit comprises a digital control loop is configured to:

increase an on-time pulse length of a corresponding one of the first, second, third and fourth transistors based on the first current being greater than the predetermined reference current value; and increase the on-time pulse length of a corresponding one of the first, second, third and fourth transistors based on the second current being greater than the predetermined reference current value.

*    *    *    *    *